M. A. AUFIERO.
AUTOMOBILE HORN.
APPLICATION FILED SEPT. 22, 1914.

1,153,534.

Patented Sept. 14, 1915.

Witnesses:
Emanuel Aufiero
Walter B. Littlefield

Inventor
Michael A. Aufiero

UNITED STATES PATENT OFFICE.

MICHAEL A. AUFIERO, OF BROOKLYN, NEW YORK.

AUTOMOBILE-HORN.

1,153,534. Specification of Letters Patent. Patented Sept. 14, 1915.

Application filed September 22, 1914. Serial No. 862,906.

*To all whom it may concern:*

Be it known that I, MICHAEL A. AUFIERO, a citizen of the United States, residing at Brooklyn, county of Kings, and State of New York, have invented new and useful Improvements in Automobile-Horns, of which the following is a complete specification.

My invention relates to a warning signal for use on automobile, motorcycles, and other vehicles; and has for its main object simplicity and compactness of design and great efficiency in warning quality with little expenditure of power.

Figure 1:
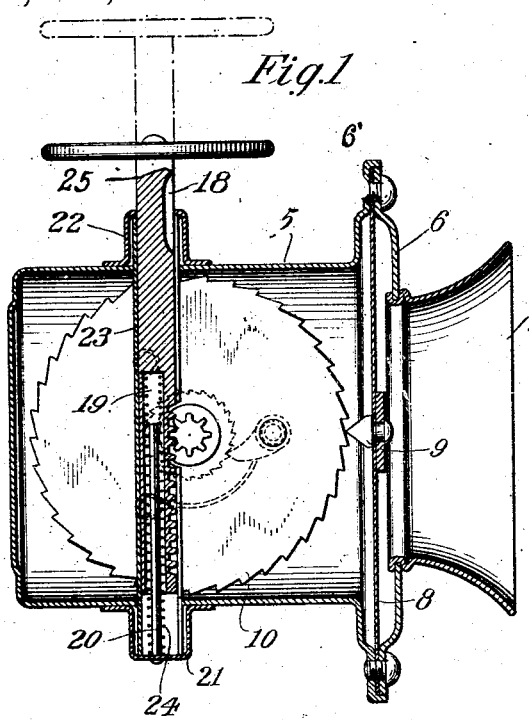
Figure 3:
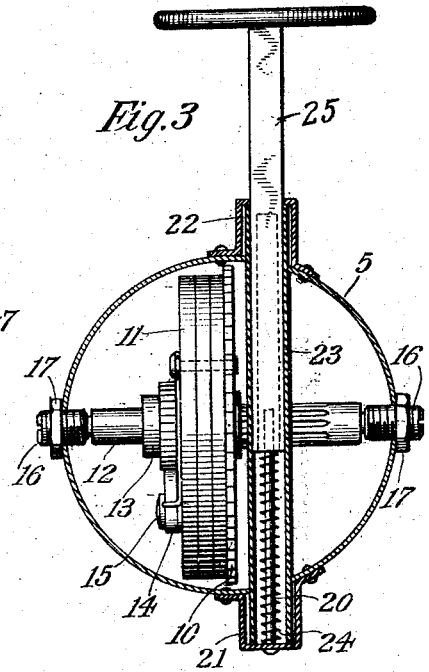
Figure 2:
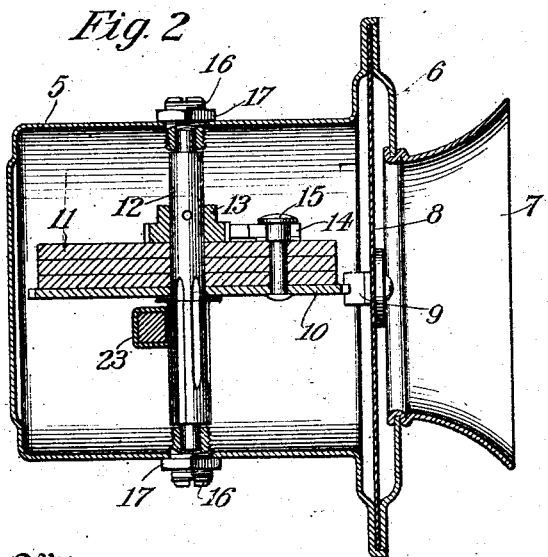
Figure 4:
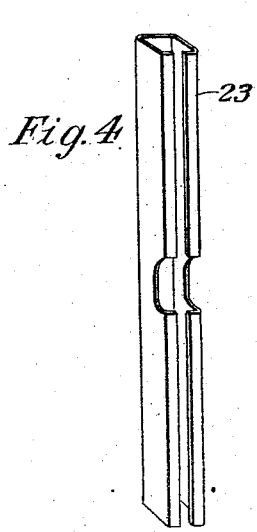

In the accompanying drawing, Figure 1, is a partly sectional side view of one embodiment of my invention; Fig. 2, is a top view; Fig. 3, a rear view, and Fig. 4, detail of bearing sleeve.

Similar numbers refer to similar parts in the different views.

Shell 5 carries at the open end a diaphragm 8; a plate 6, to which is fastened a mouth piece 7, is fastened to flange 6 of said shell and clamps the diaphragm therebetween. Rack 25 is adapted to move up and down in sleeve 23, which runs through two opposite openings in the shell 5. Said rack has a hole 19 in which a spring 24 is fitted for returning it to its upper position, after each depression by the operator. Two caps, 21 and 22, are riveted on shell 5, and are arranged to hold the sleeve 23 in position; the sleeve 21 carries a pin 20 which prevents bending of the spring when the rack moves downward. A pinion 12 is in mesh with said rack and it is adjustable in a plane at right-angles to said rack by means of adjusting bearings 16 adapted to be locked in position by means of nuts 17. The lowermost tooth of the rack 25 is larger than the other teeth, so that it will not mesh with the pinion and will prevent the rack from flying out of the sleeve 23 under the pressure of the spring.

On the pinion 12 is mounted the diaphragm actuator 10, to which is fastened the laminated fly-wheel 11. Said actuator and fly-wheel are adapted for one direction movement by means of pawl 14 engaging driving ratchet 13 fastened to the pinion 12. It will be seen that, at every push and release of the rack 25, pinion 12 will revolve in alternate directions while the member 10 and fly-wheel 11 will revolve continuously in one direction due to their momentum and the one-way connection with the pinion.

As shown in Fig. 1, the rack 25 is at its depressed position and it will be noted that the upper part of the rack has a slot 18 partly exposed and partly within the sleeve 23 for the purposes of pouring oil on the working parts of the mechanism. As shown on Fig. 4, the edges of the sleeve 23 form a channel for guiding the oil poured in the slot 18 downward on the rack.

I have discovered that very useful results are attained when the amount of engagement of the toothed actuator 10 with the wear piece 9 on the diaphragm 8 is so regulated that it will displace the diaphragm to a distance of about one tenth of the distance to which the diaphragm may be displaced before reaching its elastic limit; I have found that this engagement for a diaphragm having a vibrating area of about five inches in diameter and a thickness of about one sixty-fourth of an inch, is about one hundredth of an inch. It is known that the power for displacing the diaphragm increases with the amplitude of the displacement. I have found that with the displacement of one hundredth of an inch the weight of member 11 may be made about one pound, and with such weight, I have found that when operating the device, steady sound of approximate even pitch is produced with very little expenditure of power.

It will be understood, that the fly-wheel of one pound moving at a peripheral velocity of one foot per second will develop the proper power for displacing the diaphragm about one tenth of the distance it may be displaced without reaching its elastic limit.

What I claim is:—

1. In a signal horn, the combination of a casing, a sounding diaphragm forming one end of said casing, a revolving diaphragm actuator rotatably supported in said casing, a pinion for driving said actuator, a one-way clutch connection between said pinion and said actuator, a rack for actuating said pinion, and means for supporting said rack in said casing comprising a guide-sleeve for said rack extending across said casing with its ends projecting beyond the walls of said casing and caps inclosing the ends of said sleeve connected to said casing.

2. In a signal horn, the combination of a casing, a sounding diaphragm forming one end of said casing, a revolving diaphragm actuator rotatably supported in said casing, a pinion for driving said actuator, a one-way clutch connection between said pinion and said actuator, a rack for actuating said pinion, means for supporting said rack in said casing comprising a guide-sleeve for said rack extending across said casing with its ends projecting beyond the walls of said casing, caps inclosing the ends of said sleeve connected to said casing, said rack having one end projecting through one of said caps and provided with a recess in its opposite end, an actuating head on the projected end of said rack, a spring set in said recess in the opposite end of said rack and working against the adjacent cap, and a guide-rod set in said cap and projecting into said recess.

3. In a signal horn, the combination of a casing, a sounding diaphragm forming one end of said casing, a revolving diaphragm actuator rotatably supported in said casing, a pinion for driving said actuator, a one-way clutch connection between said pinion and said actuator, a rack for actuating said pinion, means for supporting said rack in said casing comprising a guide-sleeve for said rack extending across said casing with its ends projecting beyond the walls of said casing, caps inclosing the ends of said sleeve connected to said casing, said rack projecting through the cap at one end of the sleeve and provided with a recess in its projecting portion on the same face thereof as its teeth, whereby oil delivered to the recess will be guided by the sleeve down the rack to lubricate the working parts.

MICHAEL A. AUFIERO.

Witnesses:
EMANUEL AUFIERO,
WALTER B. LITTLEFIELD.